United States Patent [19]
Johnson et al.

[11] Patent Number: 4,747,567
[45] Date of Patent: May 31, 1988

[54] SPACECRAFT WITH ARTICULATED SOLAR ARRAY

[75] Inventors: Caldwell C. Johnson; Maxime A. Faget, both of Dickinson; David J. Bergeron, III, Friendswood, all of Tex.

[73] Assignee: Space Industries, Inc., Webster, Tex.

[21] Appl. No.: 713,882

[22] Filed: Mar. 20, 1985

[51] Int. Cl.[4] .............................................. B64G 1/44
[52] U.S. Cl. ................................. 244/173; 13.6/245; 13.6/292
[58] Field of Search ................... 244/158 R, 173, 159, 244/167, 168; 136/245, 292; 403/57, 68, 74, 78, 79

[56] References Cited

U.S. PATENT DOCUMENTS

| | | | |
|---|---|---|---|
| 2,596,632 | 5/1952 | Whitehead | 403/79 |
| 3,315,918 | 4/1967 | Schwerdtfeger et al. | |
| 3,893,573 | 7/1975 | Fletcher et al. | 244/161 |
| 4,133,501 | 1/1979 | Pentlicki | |
| 4,133,502 | 1/1979 | Anchutin | |
| 4,306,108 | 12/1981 | Henesian | |
| 4,373,690 | 2/1983 | Stillman et al. | |
| 4,375,878 | 3/1983 | Harvey et al. | |

FOREIGN PATENT DOCUMENTS

| | | |
|---|---|---|
| 0047213 | 3/1982 | European Pat. Off. |
| 5242404 | 4/1976 | Fed. Rep. of Germany |
| 2470727 | 6/1981 | France |

OTHER PUBLICATIONS

Conference: Proceedings of the 14th Intersociety Energy Conversion Engineering Conference, Boston, MA, USA (5-10 Aug. 1979), author: H. C. Ness, McDonnell Douglas Astronautics.

C. Covault, "Spacelab Program Cost Rise Threatens Gimbal", *Aviation Week & Space Technology*, vol. 117, No. 8, pp. 54-56 (Aug. 23, 1982).

*Primary Examiner*—Joseph F. Peters, Jr.
*Assistant Examiner*—Lynn M. Fiarito
*Attorney, Agent, or Firm*—Robbins & Laramie

[57] ABSTRACT

A spacecraft is disclosed which comprises a spacecraft body, at least one solar array extendible outwardly from the spacecraft body, and articulation means for adjusting the position of the solar array relative to the spacecraft body independently about three axes, each of which is orthogonal to the axis adjacent to it. Each articulation means comprises a first rotatable coupling for permitting rotation of the solar array about a first axis substantially parallel to the surface of the spacecraft body, a second rotatable coupling for permitting rotation of the solar array about a second axis normal to the first axis, and a third rotatable coupling for permitting rotation of the solar array about a third axis normal to the second axis and parallel to the longitudinal axis of the array.

6 Claims, 11 Drawing Sheets

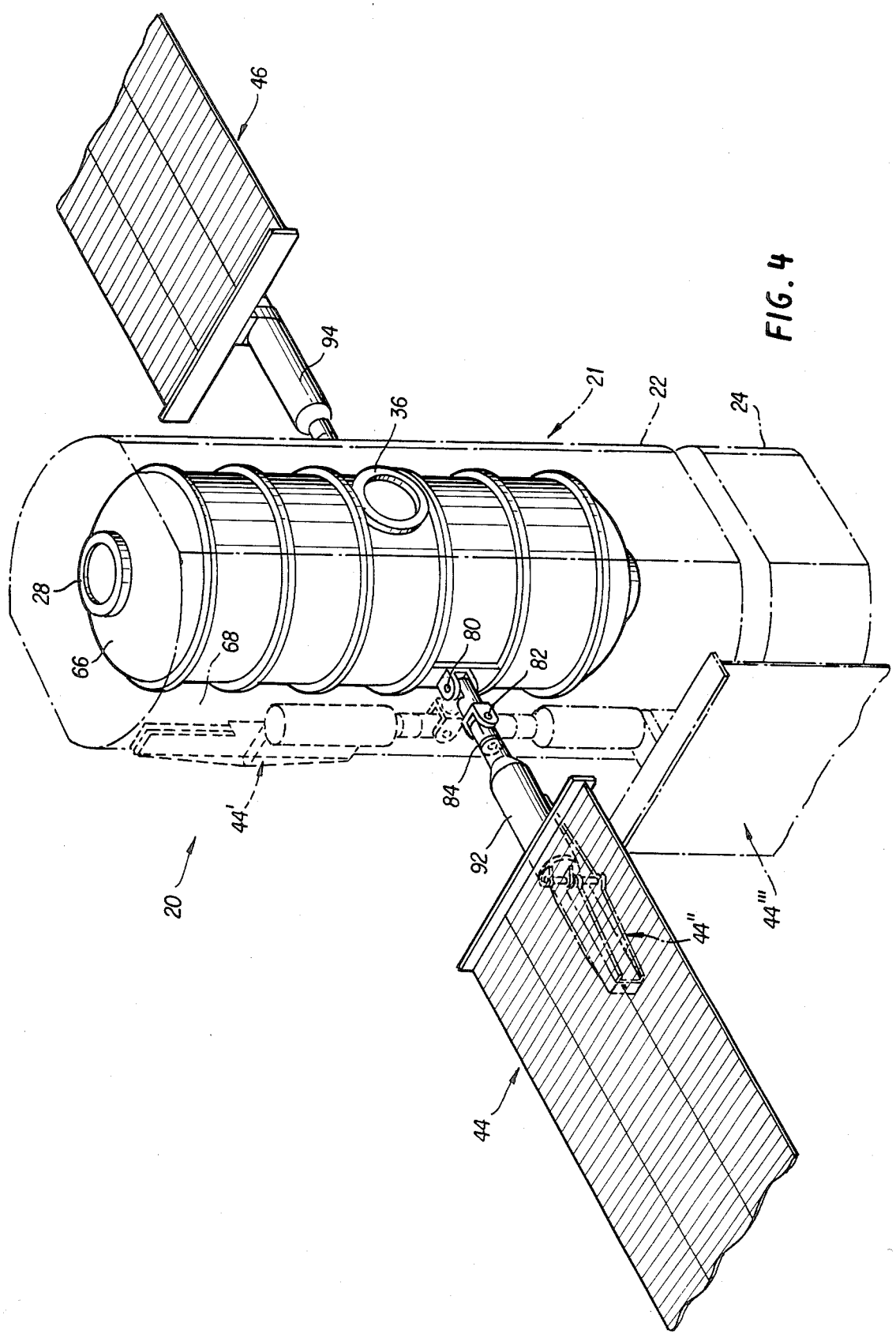

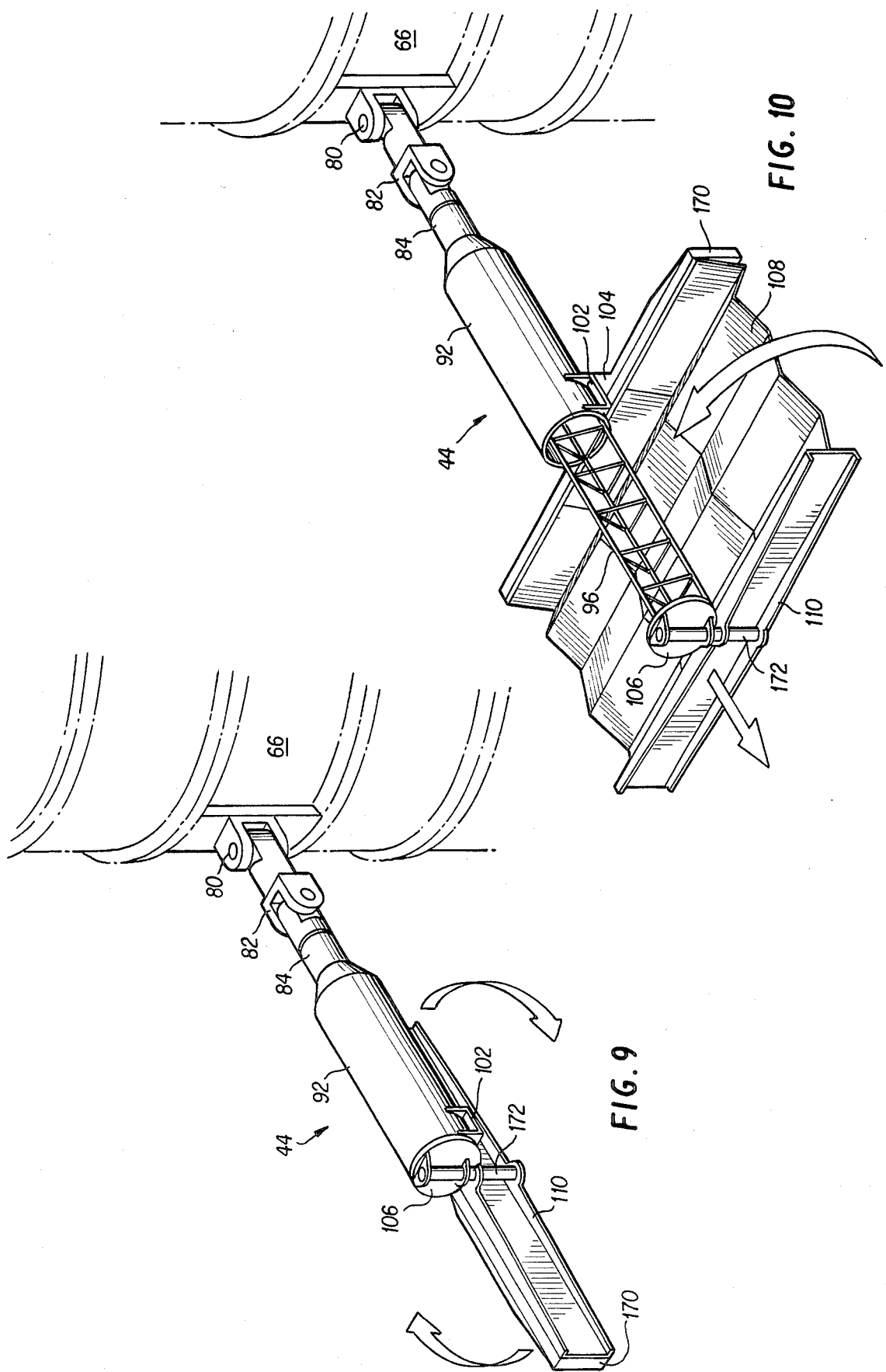

SPACECRAFT WITH ARTICULATED SOLAR ARRAY

CROSS REFERENCE TO RELATED APPLICATIONS:

Related subject matter is disclosed and claimed in U.S. patent application Ser. No. 713,816, entitled "Spacecraft Operable in Two Alternative Flight Modes", and in U.S. patent application Ser. No. 713,817, entitled "Modular Spacecraft System", both filed on Mar. 20, 1985.

BACKGROUND OF THE INVENTION

1. Field of the Invention

The present invention relates to a spacecraft having a solar array and an articulation device for adjusting the position of the solar array relative to the spacecraft. The present invention further relates to a method for deployment of the articulated solar array.

2. Description of the Prior Art

Orbiting spacecraft, such as satellites, have previously employed articulated solar arrays, the position of which could be adjusted to track the sun, and thereby, by maximize electrical power generation. Typically, the position of such articulated solar arrays was adjusted by means of articulation devices, such as gimbals, which permitted rotation of the arrays about two orthogonal axes. A first gimbal permitted rotation about an axis normal to the surface of the spacecraft. This first gimbal was generally employed to track the sun as the spacecraft moved along its orbital flight path. This is often referred to as alpha tracking. A second gimbal permitted rotation about an axis normal to the first gimbal axis and normal to the longitudinal axis of the array. The second gimbal was generally employed to track the sun as its position with respect to the orbital plane of the spacecraft changed with the seasons. This is often referred to as beta tracking. The first gimbal was typically located inboard of the second gimbal relative to the body of the spacecraft. This type of spacecraft operated with its solar arrays extended in a position such that the axis of the first gimbal was aligned normal to the orbital plane, rather than in the orbital plane, and with the longitudinal axis of the spacecraft aligned with the local vertical and pointing toward the earth. This flight mode allowed the first gimbal to rotate about its axis synchronously and phased with the orbital rate of the spacecraft so that the solar array would track the sun as the spacecraft moved along its flight path.

The previous methods for articulation of solar arrays allowed full tracking of the sun during all seasons, but produced products of inertia unfavorable to control of spacecraft attitude when the first gimbal was rotated following angular displacement of the second gimbal. Such effect would be produced regardless of the attitude of the spacecraft with respect to its orbital plane.

An additional drawback of these previous methods for articulation of solar arrays on spacecraft resulted from the fact that the solar arrays were rotated about the axis of the first gimbal aligned normal to the orbital plane in order to track the sun as the spacecraft moved along its orbital flight path. Since the solar arrays were aligned (i.e., edge-on) with the flight path for but a short time twice per obit, aerodynamic effects were produced that were unfavourable to control of attitude of the spacecraft and maintenance of its orbital altitude.

SUMMARY OF THE INVENTION

The present invention relates to a spacecraft having an articulated solar array which alleviates the limitations and drawbacks of the prior art spacecraft with articulated solar arrays. The spacecraft of the present invention comprises a spacecraft body, at least one solar array extendible outwardly from the spacecraft body, and an articulation device for adjusting the position of the solar array relative to the spacecraft body independently about three axes.

The spacecraft body can have any sutiable shape which will not interfere with the movement of the solar arrays. Preferably, the spacecraft body has a generally cylindrical shape. The spacecraft body preferably includes a compartment for stowage of a solar array. The spacecraft body also preferably includes an inner chamber which is located within the spacecraft body. The inner chamber preferably has a generally cylindrical shape and is located within the spacecraft body in an eccentric position, that is, in a position such that the longitudinal axis of the inner chamber is parallel to and displaced from the longitudinal axis of the spacecraft body.

The present spacecraft further comprises at least one solar array which is extendible outwardly from the spacecraft body. Preferably, the spacecraft comprises two solar arrays which are extendible outwardly from opposite sides of the spacecraft body. Each extendible solar array is preferably of the type which comprises a housing containing an extendible support member, such as a coilable mast, and a foldable array of solar cells supported by the extendible support member. When the mast is extended out of the housing, the array of solar cells is unfolded, resulting in a generally planar array supported along its longitudinal axis by the extended mast.

The spacecraft of the present invention further comprises an articulation device for adjusting the position of the solar array relative to the spacecraft body independently about three axes. The articulation device comprises three rotatable couplings. Any of the well-known types of rotatable couplings can be employed. Preferably, the rotatable couplings are of the single-axis gimbal type. A first rotatable coupling permits rotation of the solar array about a first axis which is substantially parallel to the surface of the spacecraft body. A second rotatable coupling permits rotation of the solar array about a second axis which is normal to the first axis. A third rotatable coupling permits rotation of the solar array about a third axis which is normal to the second axis and parallel to the longitudinal axis of the array. The first rotatable coupling is located inboard of the second rotatable coupling and the second rotatable coupling is located inboard of the third rotatable coupling relative to the spacecraft body. In an alternative embodiment, the second rotatable coupling is located inboard of the first rotatable coupling and the first rotatable coupling is located inboard of the third rotatable coupling relative to the spacecraft body. These two alternative embodiments are possible because two orthogonal axes may be substantially parallel to the surface of the spacecraft body and the first axis about which the first rotatable coupling rotates is normal to the second axis about which the second rotatable coupling rotates.

In a further embodiment of the present invention, the spacecraft alternatively comprises an articulation device for adjusting the position of the solar array relative to the spacecraft body independently about two axes. This alternative articulation device comprises two rotatable couplings, the first of which permits rotation of the solar array about a first axis which is substantially parallel to the surface of the spacecraft body, and the second of which permits rotation of the solar array about a second axis which is normal to the first axis and parallel to the longitudinal axis of the array. In this embodiment, the first rotatable coupling is located inboard of the second rotatable coupling, relative to the spacecraft body. These two rotatable couplings correspond to the two outer rotatable couplings in the articulation device which comprises three rotatable couplings.

In a further aspect, the present invention relates to a method of deployment of a solar array of the present spacecraft. In the deployment method of the present invention, the solar array is first removed from its stowed position within the compartment in the spacecraft body. In the stowed position of the solar array, the canister is in a position in which its longitudinal axis is parallel to the first axis of the first rotatable coupling, the extendible support member is retracted within the canister, and the array of solar cells is in a folded or furled position. The solar array is removed from this stowed position within the compartment by rotating the first rotatable coupling about its axis.

Following removal from the compartment, the solar array in its stowed position is moved away from the spacecraft body by rotating the second rotatable coupling about is axis.

The extendible support member is then extended outwardly from within the canister. As the extendible support member extends outwardly, the folded array of solar cells is unfolded. When the extendible support member has reached its fully extended position, the array of solar cells will likewise be fully unfolded and generally planar in shape, and will be supported along its longitudinal axis of the extended support member.

Depending upon the position of the solar cells with respect to the sun, the method of deployment can further comprises the step of rotating the third rotatable coupling about its axis.

The spacecraft of the present invention has a number of advantages over the prior spacecraft with articulated solar arrays. The addition of the first rotatable coupling which permits rotation of the solar array about an axis which is substantially parallel to the surface of the spacecraft body provides a degree of freedom of the solar array not previously available. This additional rotatable coupling provides a means for stowing the array within the spacecraft body and for removing the second rotatable coupling and the array from their stowed position within the spacecraft body to a position outside the spacecraft body.

Prior spacecraft with articulated solar arrays could not be readily coupled together in a side-by-side arrangement to form a space station or space platform, because their solar arrays could only be rotated about two axes. If two such spacecraft were to be coupled side-by-side, their adjacent solar arrays would mechanically interfere and one array would occlude the adjacent array with respect to the incident solar radiation. However, by providing a first rotatable coupling which permits rotation about a first axis on each spacecraft so that the respective first axes on each spacecraft are parallel, and by rotating the adjacent solar arrays in opposite directions about their respective first axes, an angular spread or spacing between the arrays is produced in which one solar array does not mechanically interefere with or substantially occlude the adjacent solar array, thereby permitting the side-by-side coupling of the two spacecraft.

The addition of the first rotatable coupling is also advantageous when the spacecraft is berthed to the National Space Transportion System (NSTS), also referred to as the Space Shuttle. When the spacecraft is being serviced by the Shuttle remote manipulator system (RMS), is is possible to rotate the solar arrays out of the way of the RMS by rotating the first rotatable coupling about its axis.

Additional advantages will be realized by locating the third rotatable coupling, which permits rotation of the solar array about an axis parallel to the longitudinal axis of the solar array, in the most outboard position relative to the spacecraft body, regardless of whether one or both of the first and second rotatable couplings are located inboard of the third rotatable coupling. Rotation of a solar array about an axis of a rotatable coupling which is located inboard of the third rotatable coupling will have no effect on the moment of inertia of the solar array about the axis of rotation of the third rotatable coupling. If the solar array is rotated about an axis of an inboard rotatable coupling, rotation of the solar array about the axis of the third rotatable coupling will only produce insignificant products of inertia. Moreover, by placing a rotatable coupling which permits rotation of the solar array about an axis substantailly parallel to the surface of the spacecraft body in the inboard position relative to the spacecraft body, it is possible, not only to provide the solar array with another axis about which it can be rotated, but also to stow the solar array within the spacecraft body and remove it from its stowed position by means of the same rotatable coupling.

BRIEF DESCRIPTION OF THE DRAWINGS

The various objects, advantages and novel features of the present invention will be more readily apprehended from the following detailed description when read in conjunction with the appended drawings, in which:

FIG. 4 is a perspective view illustrating the deployment and articulation of the solar arrays;

FIGS. 7-11 are sequence views illustrating the deployment of one of the solar arrays.

Throughout the drawings, like reference numerals should be understood to refer to like parts and components.

Figure 1A:
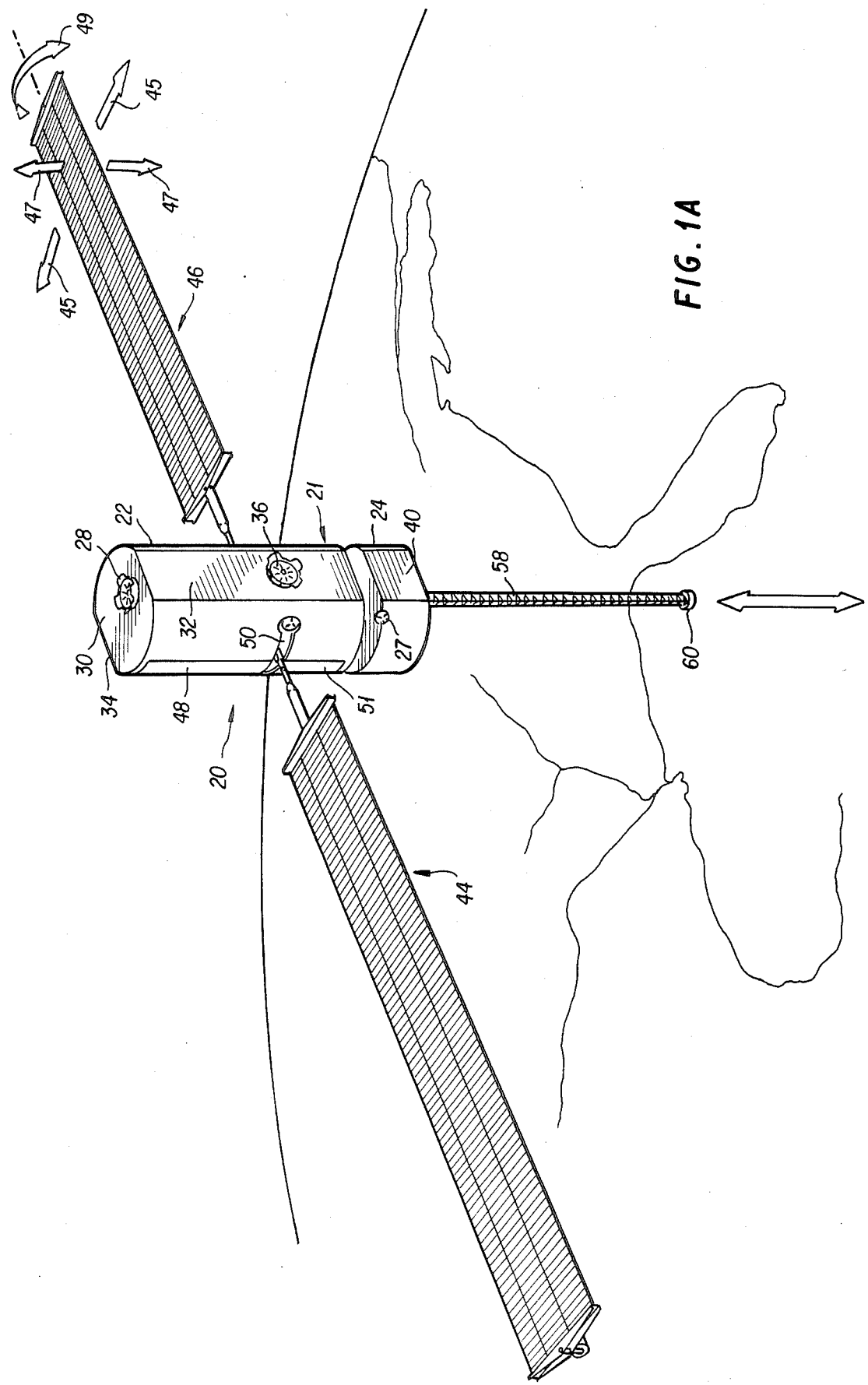
FIG. 1A is a top perspective view of a man-tended orbiting spacecraft constructed in accordance with the principles of the present invention.
Figure 1B:
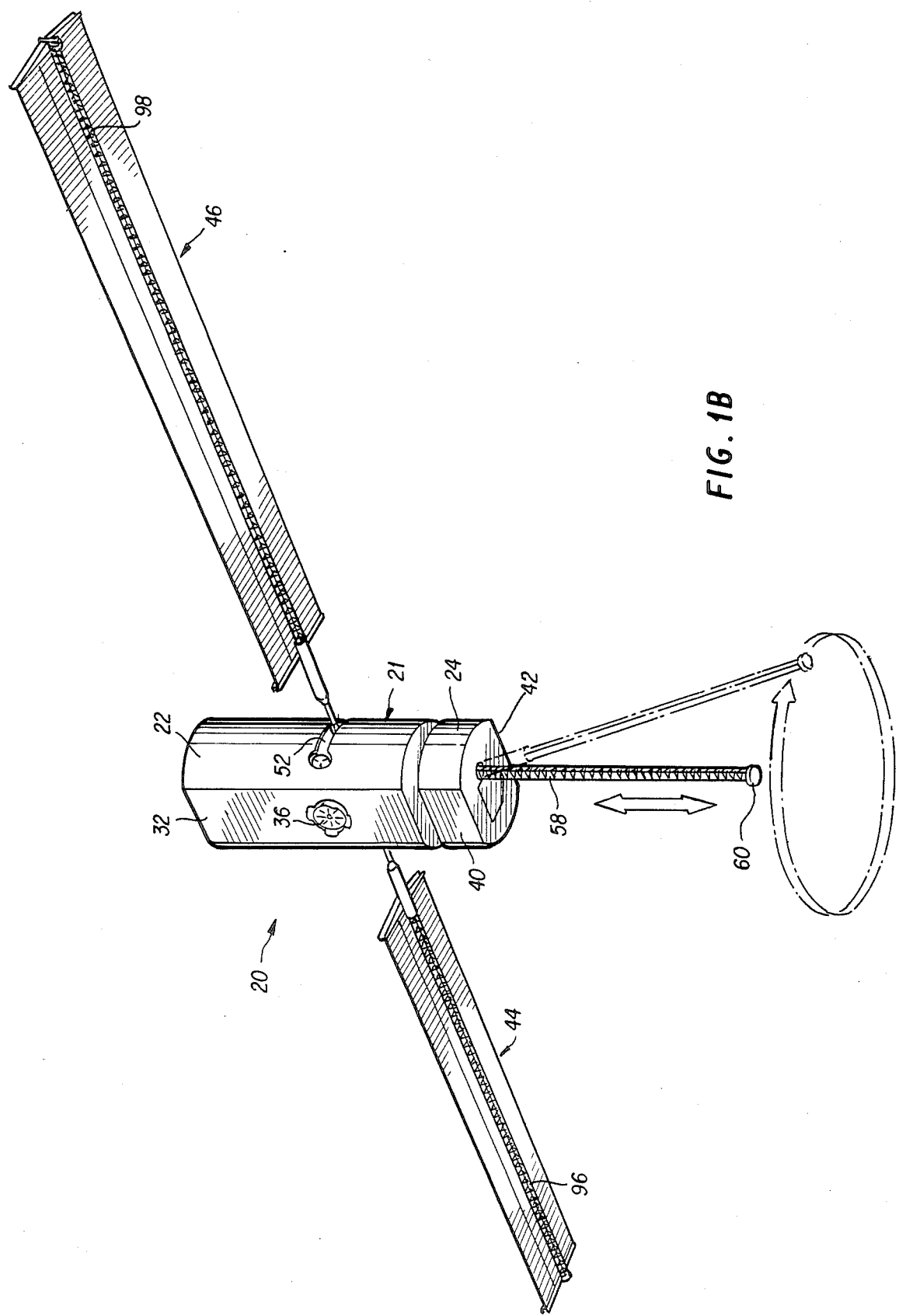
FIG. 1B is a bottom perspective view of the spacecraft.

DETAILED DESCRIPTION OF THE PREFERRED EMBODIMENT:

FIGS. 1A and 1B illustrate a spacecraft 20 which is constructed in accordance with the principles of the present invention. The spacecraft 20 may be of any desired type, but in the preferred embodiment it comprises a man-tended space platform which is usable for industrial or research purposes. To this end, the spacecraft body 21 comprises two generally cylindrical sections 22 and 24, the upper section 22 being referred to as the facility module and the lower section 24 being referred to as the supply or logistics module. The facility module 22 is a permanent module containing equipment and payloads appropriate to the spacecraft mission. By way of example, the payloads may be adapted to carry out materials processing operations, new product development, or life sciences research. A particularly important type of materials processing, referred to as electrophoresis operations in space (EOS), can be used for the purification of pharmaceutical and biological products. Other commercially valuable processes include the production of monodisperse latex spheres for medical applications, growth of large ultra-pure semiconductor crystals, containerless processing of fiber-optic glasses, and creation of exotic metal alloys and other composites which cannot be produced in a gravity environment. The facility module payloads can be configured as "factories" for carrying out one or more of these processes automatically and without human supervision. In addition to the payloads themselves, the facility module 22 also carries the necessary equipment to support the payloads, such as fluid tanks, pumps, batteries, power conditioning equipment, heat exchangers, and so on. The supply module 24 is a temporary or exchangeable module which provides logistic support for the facility module 22 and its payloads. In the case of an electrophoresis payload, for example, the supply module 24 is fitted with EOS media tanks, EOS product tanks, nitrogen tanks to support the EOS process, and asociated plumbing lines and cooling equipment.

The spacecraft 20 shown in FIGS. 1A and 1B is intended to be placed in near circular earth orbit by means of a single, dedicated launch of the NASA Space Shuttle. The facility module 22 and supply module 24 are dimensioned to fit in the cargo bay of the Shuttle vehicle, and the outer hulls of both modules are provided with grapple fittings 26, 27 which can be engaged by the remote manipulator system (RMS) of the Shuttle to allow orbital emplacement and recapture. The spacecraft 20 is not permanently manned, but includes pressurization and life support equipment suitable for shirtsleeve operation when berthed to the Shuttle. A berthing mechanism 28 is provided in the flat upper face 30 of the facility module 22 to allow access by the Shuttle crew. The berthing mechanism 28 is engageable with a berthing adapter carried in the cargo bay of the Shuttle vehicle. The spacecraft 20 and its materials processing equipment are put into automated operation before being left in orbit by the Shuttle crew. The Shuttle returns as necessary (i.e., about once every three months) with a new supply module to resupply the spacecraft payloads and the operational needs of the spacecraft, and to harvest the products manufactured. During these visits, the Shuttle crew occupy the spacecraft 20, but are sustained principally by the Shuttle. Resupply of the spacecraft and its materials processing equipment is through exchange of a fresh supply module for a depleted supply module, achieved by means of the Shuttle RMS.

Figure 2A:
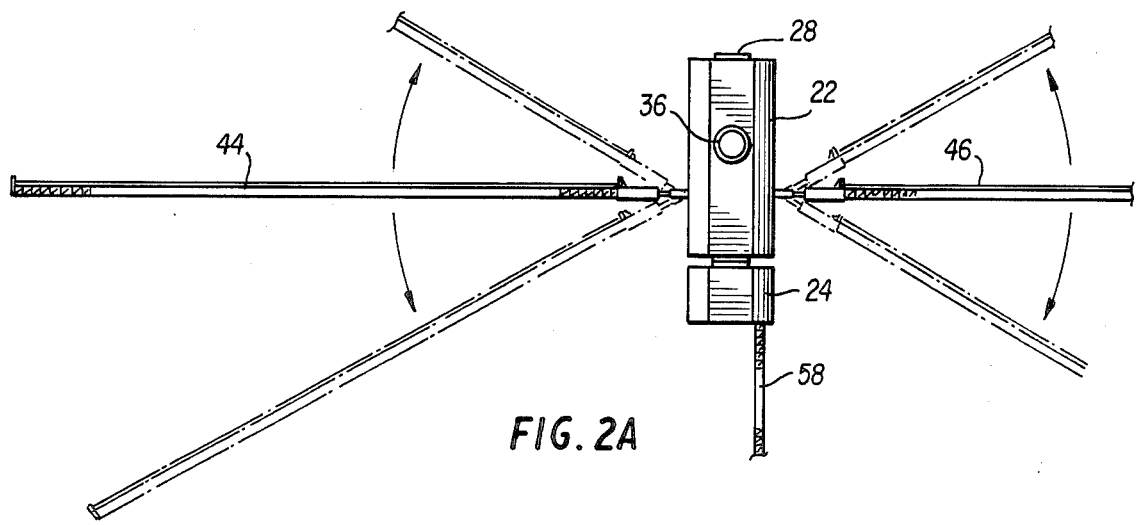
FIG. 2A is a side elevational view of the spacecraft, illustrating the alpha rotation of the solar arrays.

The spacecraft 20 is designed to allow modular expansion by adding additional facility modules 22 and supply modules 24 in a side-by-side arrangement. This is achieved by using the Shuttle RMS to capture a spacecraft which is already in orbit, and then coupling the captured spacecraft to a second spacecraft carried in the Shuttle cargo bay. The use of two or more coupled spacecraft allows a multiplication in the capability for materials processing. The side-to-side coupling between spacecraft is facilitated by forming the outer shell of the facility module 22 with diametrically opposed flattened or planar sections 32, 34 which extend along the length of the module. Berthing mechanisms 36, 38 are provided in these flattened or planar sections of the facility module hull. (Berthing mechanism 38 is not visible in FIGS. 1A and 1B but can be seen in FIG. 2A.) Similar flattened sections 40, 42 are formed at diametrically opposed locations on the outer hull of the supply module 24, and these flattened sections are in alignment with the flattened sections 32, 34 of the facility module hull as shown. Further details concerning the modular expansion feature of the spacecraft 20 may be found in a copending U.S. patent application of Maxime A. Faget, Caldwell C. Johnson and David J. Bergeron III, filed on Mar. 20, 1985 under Ser. No. 713,817 and entitled "Modular Spacecraft System", which application is incorporated by reference herein.

Figure 2B:
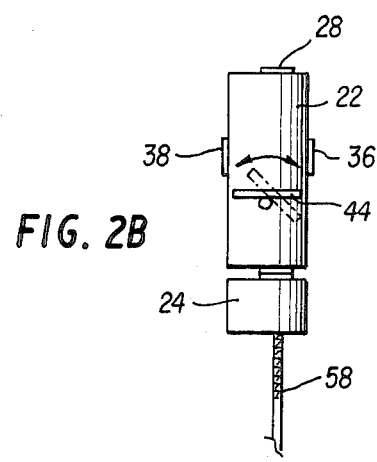
FIG. 2B is a front elevational view of the spacecraft, illustrating the beta rotation of the solar arrays.
Figure 2C:
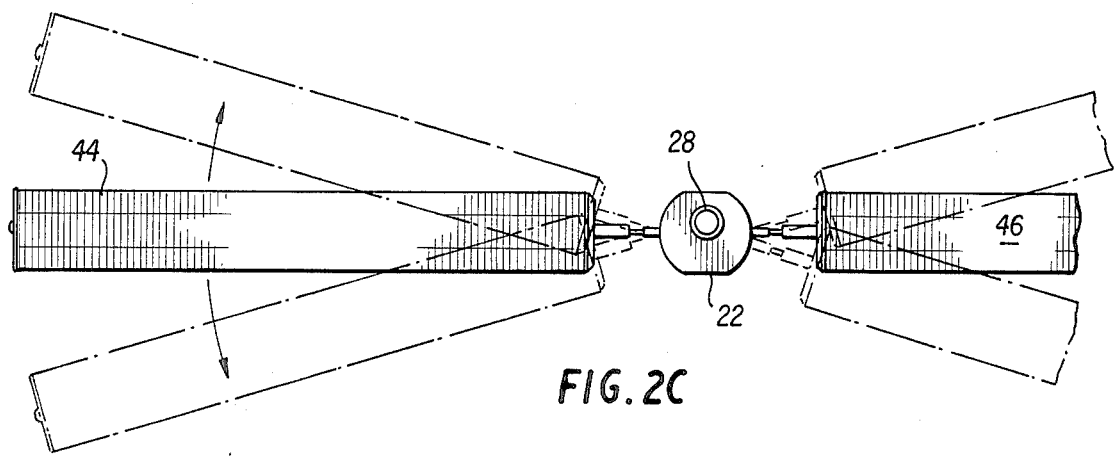
FIG. 2C is a top plan view of the spacecraft, illustrating the gamma rotation of the solar arrays.

With continued reference to FIGS. 1A and 1B, the facility module 22 carries a pair of articulated solar arrays 44, 46 which generate the electrical power required by the spacecraft 20. Electrical power is required principally for the materials processing payloads carried aboard the facility module 22, but also to some extent for guidance, navigation and attitude control functions, for data management, for environmental and thermal control, and for tracking, telemetry and related control functions. In their stowed positions, the solar arrays 44, 46 are housed behind a pair of swing-out doors in the upper portion of the facility module 22, one of these doors 48 being partially visible in FIG. 1A. The solar arrays 44, 46 extend outwardly from opposite sides of the facility module 22 when deployed, and are joined to the facility module by a number of gimbals (shown in FIGS. 3A and 3C) which permit the arrays to be rotated independently about three mutually orthogonal axes. These independent rotations, which are referred to as gamma, alpha and beta rotations, are illustrated by the arrows 45, 47, 49 in FIG. 1A and are shown individually in FIGS. 2A, 2B and 2C respectively. The alpha rotation, shown in FIG. A, occurs about a horizontal axis which is perpendicular to the longitudinal axis of the spacecraft body 21. The beta rotation, shown in FIG. 2B, constitutes a pivoting of the array about its longitudial axis. The gamma rotation, shown in FIG. 2C, occurs about a vertical axis which is parallel to the longitudinal axis of the spacecraft body. These rotations are used to allow initial deployment of the solar arrays 44, 46 from their stowed positions within the facility modules 22. In addition, when the spacecraft is being operated in an earth-oriented flight mode in which the solar arrays lead and trail along the flight path, beta rotations will improve the facing of the arrays toward the sun from all positions in the orbit as well as for all inclinations of the orbit with respect to the sun. Alpha rotations will further improve the facing of the arrays toward the sun, but are only necessary when maximum power must be generated.

The first gimbal of each solar array, which permits the gamma rotation, is mounted inboard relative to the second and third gimbals and is affixed to an inner pressure hull (not shown in FIGS. 1A and 1B) which is supported in an eccentric position within the outer shell of the facility module 22. Since the first gimbal is physically positioned within the gap or space between the inner hull and outer shell, a pair of horizontal slots 50, 52 are formed in the outer shell of the facility module 22 in order to allow gamma rotation of the arays 44, 46 to occur without inteference from the outer shell. The second gimbal, permitting the alpha rotation, is located outboard relative to the first gimbal and inboard relative to the third gimbal, which allows the beta rotation. The second gimbal is external to the outer shell of the facility module when the array is fully deployed, and for that reason a separate vertical slot is not needed in the outer shell to allow alpha rotations to occur. The third gimbal is located outboard relative to the second gimbal and is also external to the outer shell of the facility module when the arrays are fully deployed as shown. The actuators for the three gimbals are driven by electric motors and provision is made for indicating the rotational position of each gimbal for control purposes.

The spacecraft 20 includes active and passive attitude control means to permit orbital flight in two alternative modes. In the preferred embodiment, the active control means comprises a pair of double-gimbal control moment gyroscopes (indicated at 69 and 71 in FIGS. 3A and 3C) to enable three-axis control. The control moment gyroscopes may be Model M325 double-gimbal units which are available from the Sperry Flight Systems division of Sperry Corporation, located in Phoenix, Ariz. Oher types of active attitude control devices which can be used include momentum wheels and magnetic torques. The passive attitude control means comprises a gravity gradient stabilization device in the form of an elongated boom 58. The boom 58 is of the coilable or deployable type and is carried by the supply module 24. A heavy mass 60 is attached to the lower end of the boom 58 in order to enhance the gravity gradient effect. In the preferred embodiment, the fully extended length of the gravity gradient boom 58 is about 100 feet, and the mass 60 comprises a 200-pound lead disk. By comparison, the combined length of the facility module 22 and supply module 24 is about 46.5 feet and the diameter of each module is about 14.5 feet. The combined weight of the facility module 22 and supply module 24 is about 36,000 pounds.

In addition to the active and passive attitude control means, the spacecraft 20 is provided with a number of cold gas thrusters (not shown) positioned at various locations on the surface of the facility module 22 and supply module 24. The cold gas thrusters are used for orbit-keeping and for maneuvering the spacecraft 20 during berthing with the Shuttle vechicle or with other spacecraft.

The gravity gradient boom 58 is extendible from and retractable into the supply module 24 and can be controlled in a variable or continuous manner so as to be capable of any desired degree of extension or retraction. With the boom 58 extended, the spacecraft 20 can be stabilized in an earth-oriented flight mode. In this orientation, the boom 58 may be directed either toward or away from the earth, although in the usual case it will be directed toward the earth. The earth-oriented flight mode provides the spacecraft with a stable attitude and requires only a minimum amount of active attitude control and orbit-keeping. With the boom 58 partially or completely retracted, the spacecraft can be stabilized in a quasi sun-oriented flight mode (i.e., with the same side always facing toward the sun) through the use of the active attitude control means. This flight mode is preferred when it is desired to obtain maximum power from the solar arrays 44, 46 for use by the materials processing payloads of the facility module 22, since in this orientation the arrays can be made to face directly toward the sun at all points in the sunlit portion of the spacecraft orbit with only occasional and minor adjustment of the solar array gimbals.

The gravity gradient boom 58 may be partially extended during quasi sun-oriented orbital flight in order to cause the moments of inertia about the two axes of the spacecraft 20 that lie in the orbital plane to be made substantially equal. This allows the spacecraft to be made neutrally stable in the orbital plane, and thus requires a minimum amount of active attitude control to maintain the spacecraft in the desired orientation. Such a capability is particularly desirable in the case of a spacecraft 20 of the type described herein, in which different types of supply modules 24 will be used to support different types of materials processing payloads in the facility module 22. The supply modules may have different sizes and masses and may therefore have the effect of changing the moments of inertia of the spacecraft 20. In addition, continual movement of fluids between the supply module 24 and facility module 22 will occur as a conseqence of the materials processing operations carried out in the facility module payloads. This will cause a continual redistribution of mass within the spacecraft and hence a gradual change in the moments of inertia of the spacecraft. These effects can be counteracted by extending or retracting the boom 58 to the degree necessary to equalize the moments of inertia in the orbital plane and hence maintain neutral ability of the spacecraft. Preferably, the spacecraft 20 is designed so that in its nominal or baseline configuration it is neutrally stable when the gravity gradient boom 58 is extended by a certain fraction of its full length. In this way, the boom can be adjusted in two directions (i.e., by further extension or further retraction) to achieve neutral stability of the spacecraft when the distribution of mass changes due to the factors mentioned above.

Varying the length of the boom 58 may also be used to adjust the natural frequency of the spacecraft to avoid or enhance oscillatory response. The spacecraft 20 will experience torques due to aerodynamic imbalances and other factors. These imbalances will vary, generally as some function of the orbital period. The natural frequency of the spacecraft will affect its response to the torques created by these imbalances. By changing the length of the gravity gradient boom 58, the natural frequecy of the spacecraft may be set at a value such that the spacecraft oscillations are minimized. Alternatively, it may be desired to enhance oscillatory response in certain situations, and this may also be accomplished by adjusting the length of the boom 58.

As an example, it might be desired to induce and oscillation of the spacecraft 20 which is related to the orbital period in a manner such that solar tracking is carried out automatically, with little or no exercise of active attitude control. Further details concerning the gravity gradient boom 58 and the earth-oriented and sun-oriented orbital flight modes may be found in a copending U.S. patent application of Caldwell C. Johnson, Maxime A. Faget and David J. Bergeron III, filed on Mar. 20, 1985 under Ser. No. 713,816 and entitled "Spacecraft Operable in Two Alternative Flight Modes", which application is incorporated by reference herein.

Figure 3A:
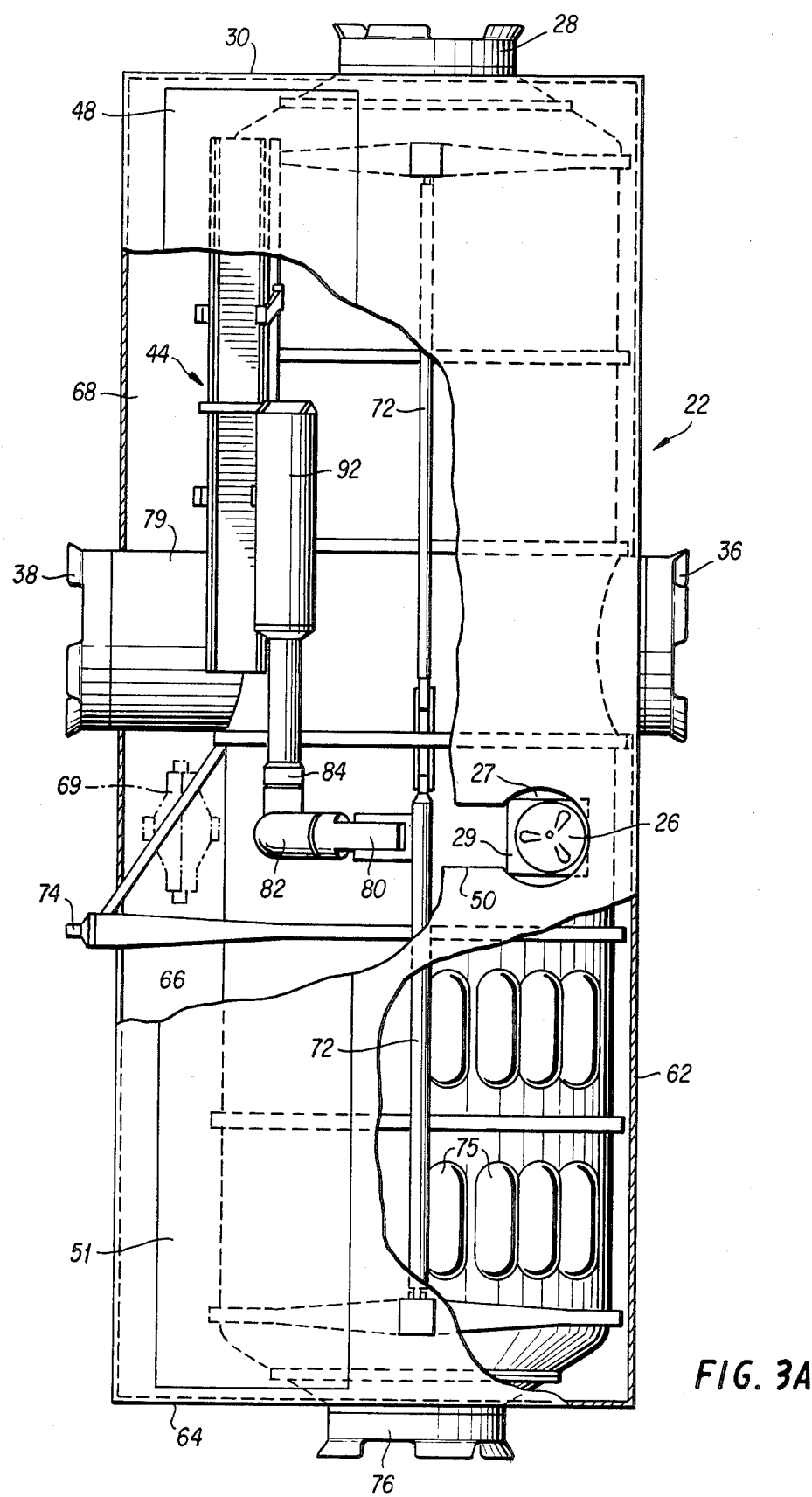
FIG. 3A is a side elevational view of the facility module which constitutes the upper section of the spacecraft body.
Figure 3B:
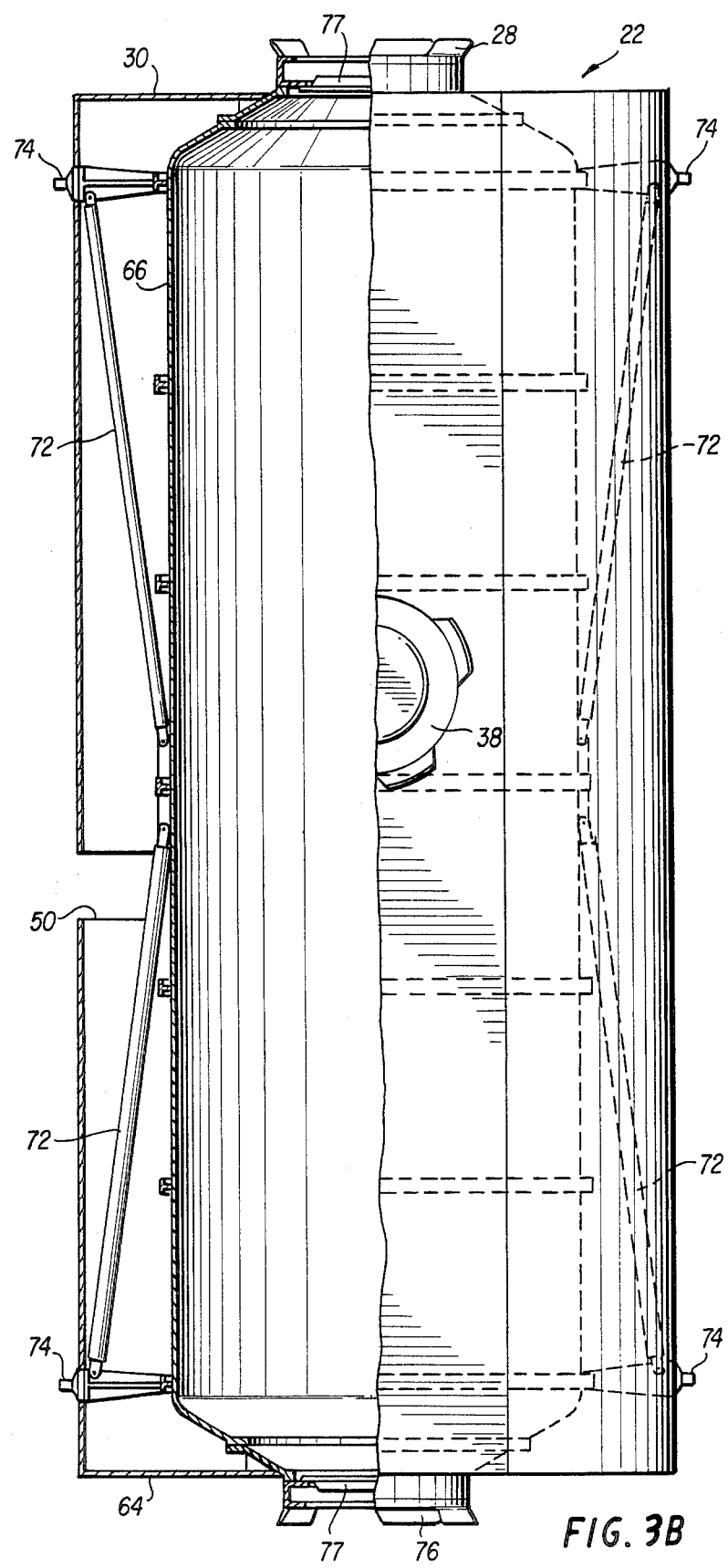
FIG. 3B is a partial side sectional view of the facility module taken from another angle.
Figure 3C:
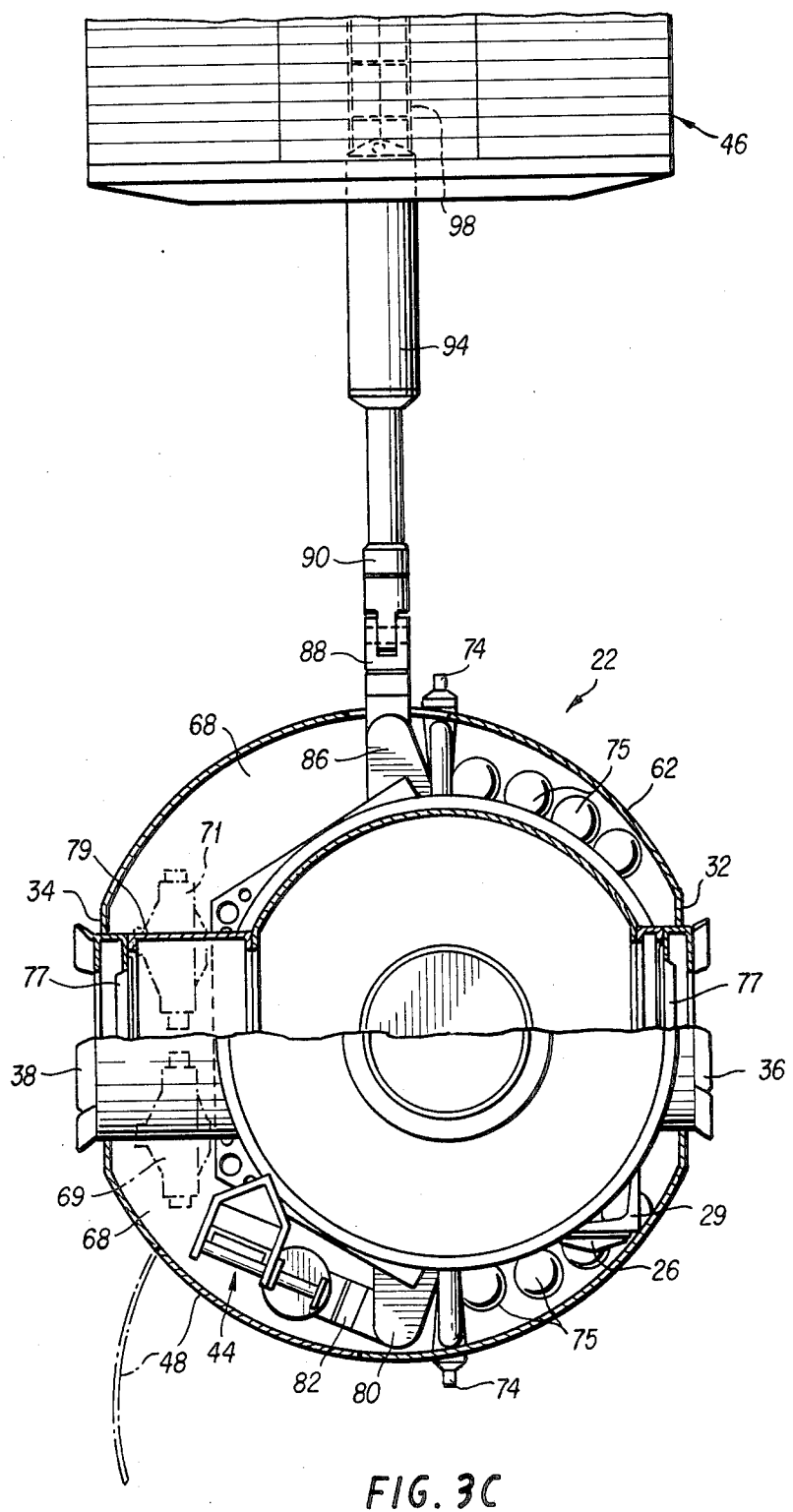
FIG. 3C is a top sectional view of the facility module, with one solar array shown in the stowed position and the other solar array shown in the fully deployed position.

The details of the facility module 22 are illustrated in FIGS. 3A, 3B and 3C. The outer shell 62 of the facility module is generally cylindrical in shape with planar or flattened portions 32, 34 extending vertically on each side as described previously. The outer shell 62 serves as a thermal and meteorite shield for the facility module and also contains integral coolant passages and manifolds allowing it to serve as a heat radiator for dissipating heat generated by the operation of the facility module and its payloads. The radiator skin is preferably pierced by a regular pattern of holes (not shown) to allow temporary or permanent attachment of mobility and restraint aids or external appertenances during extra-vehicular activty (EVA) by the Shuttle crew. The underside of the radiator may be lined with a multilayer thermal insulation. The upper and lower ends 30, 64 of the outer shell do not serve as heat radiators but comprise discrete thermal and meteorite shields for protection of the ends of the facility module 22. The primary structure of the facility module consists of an inner pressure hull 66, which is generally cylindrical in shape and is supported within the outer shell 62. As can be seen most clearly in FIG. 3C, the vertical or longitudinal axes of the inner hull 66 and outer shell 62 are offset from each other, with the result that the inner pressure hull 62 is mounted eccentrically within the outer shell 62. This provides an external payload area 68 in the region between the inner hull 66 and outer shell 62. The external payload area 68 carries the stowed solar arrays 44, 46, the control moment gyroscopes 69, 71 that are used for active control of the spacecraft attitude, and other payload support equipment (not shown) such as batteries and power conditioning equipment, fluid tanks, heat exchangers, and so on. The upper door 48 communicates with the upper part of the external payload area 68 of one side of the facility module to allow deployment of the solar array 44. A lower door 51 serves as a continuation of the upper door 48 below the slot 50, and allows access to the lower part of the external payload area. An identical set of upper and lower doors is provided on the opposite side of the facility module where the second solar array 46 is mounted. The inner pressure hull 66 is an airtight structure made of welded aluminum alloy plate with frames and stiffeners fabricated from rolled plate. A number of air tanks 75 are affixed around the inner pressure hull 66 to provide propulsion and pressurization of the spacecraft interior. A number of internal structural elements 72 provide a supporting framework for the inner pressure hull 66 and also provide connection to the outer shell 62. The structural elements 72 also carry trunnions 74 which allow the facility module 22 to be mounted in the Shuttle cargo bay.

The inner pressure hull 66 contains the various materials processing payloads which are carried by the facility module 24. In the case of an electrophoresis payload, the EOS "factory" is mounted in the pressure hull 66 of the facility module, while the various storage tanks for EOS media, product and pressurization gas are mounted in the supply module 24. The plumbing between the facility and supply modules must be disconnected and reconnected during each supply module changeout. In addition to the materials processing payloads themselves, the interior of the pressure hull 66 is fitted with floors, walls, and ceilings to cover and protect equipment mounted against the pressure hull, and also with mobility and restraint devices such as handholds and footholds built into the floors and the walls. The interior of the pressure hull 66 is also provided with suitable equipment supports to allow mounting of the materials processing payloads, and with cabinets and lockers for use by the Shuttle crew during maintenance and supply module changeout.

The facility module 22 is provided with a number of berthing mechanisms 28, 36, 38 and 76. Each berthing mechanism includes a hatch closure 77 with a viewport and each communicates with the interior of the inner pressure hull 66. The upper berthing mechanism 28 is used for berthing with a berthing adapter in the Shuttle cargo bay, and allows the Shuttle crew to enter the facility module 22 in order to service the payloads carried within the inner pressure hull 66. The lower bearing mechanism 76 allows the facility module 22 to be connected to a supply module 24 as illustrated in FIGS. 1A and 1B. The berthing mechanism 36, 38 on the planar side areas 32, 34 of the facility module allow the facility module 22 to be joined to other identical facility modules in a side-by-side arrangement to create a modular spacecraft as described earlier. Due to the eccentric mounting of the inner pressure hull 66 with respect to the outer shell 62, the berthing mechanism 38 communicates with the interior of the inner pressure hull through a short tunnel or passage 79. Terminals for manually connecting fluid and electrical jumper lines between adjacent facility modules, or between a facility module and a supply module, are located in the vestibule areas between berthing mechanisms.

The facility module 22 is provided with a pair of grapple fittings 26, one being visible in FIGS. 3A and 3C, to enable the Shuttle RMS to remove the facility module from the cargo bay during initial activation, and to reacquire the facility for reberthing the Shuttle. The grapple fittings are recessed in apertures 27 formed in the outer shell 62 and are supported by mountings 29 which provide thermal insulation from the inner pressure hull 66.

The solar array 44 is shown in its stowed position in FIGS. 3A-3C, while the array 46 is shown in the fully deployed position. This is done for the purpose of illustration only, it being understood that both arrays will normally be in the same condition (i.e., either stowed or deployed) in the actual spacecraft. In the stowed position, used when the spacecraft 20 is being carried in the Shuttle cargo bay prior to initial activation, the arrays are housed within the external payload area 68 between the inner hull 66 and outer shell 62 as described previously. The array 44 is joined to one side of the inner pressure hull 66 by a series of connected gimbals consisting of a first or inboard gimbal 80, a second or central gimbal 82, and a third or outboard gimbal 84. The array 46 is joined to the opposite side of the inner pressure hull by an identical series of connected gimbals consisting of a first or inboard gimbal 86, a second or central gimbal 88, and a third or outboard gimbal 90.

During deployment, the gimbals rotate in a prescribed order to cause the folded arrays 44, 46 to pivot out of the external payload area 68. As this occurs, the coilable masts 96, 98 (fully visible in FIG. 1B) are deployed from the canisters 92, 94 in which they are stowed, causing the arrays 44, 46 to unfurl in an accordian-like manner to their full length. Once deployed, the arrays 44, 46 are supported by the masts 96, 98 and may be periodically rotated about their longitudinal axes by the outboard gimbals 84, 90 to achieve solar tracking. The arrays 44, 46 may also be rotated about axes parallel to the longitudinal axis of the spacecraft body 21 by the inboard gimbals 80, 86 to provide adequate clearance between adjacent panels when several facility modules 22 are connected together to create a modular spacecraft system. Each of the gimbals 80, 82, 84 and 86, 88, 90 may comprise a commercially available unit known as a Solar Array Drive And Power Transfer Assembly (SADAPTA), manufactured by Spar Aerospace Limited of Weston, Ontario, Canada.

FIG. 4 is a perspective view illustrating in more detail the deployment and articulation of one of the solar arrays 44 carried by the facility module 22. It should be understood that the construction and operation of the second array 46 is substantially identical. The construction of both arrays, outboard of the gimbal systems 80, 82, 84 and 86, 88, 90, is based on a design by the Space Systems Division of Lockheed Missiles and Space Company, Inc., of Sunnyvale, Calif., referred to as the LMSC Solar Array Flight Experiment (SAFE). In the fully stowed position 44', the array is housed in the external payload area 68 of the facility module as indicated in hidden lines in FIG. 4. The deployment sequence begins with a 90° rotation of the array 44 and canister 92 about the inboard gimbal 80, causing the array to emerge from the external payload area through the door 48 of FIG. 1A. The array 44 and canister 92 then rotate 90° about the second gimbal 82 in order to align the canister in an outwardly facing position with respect to the facility module 22. This corresponds to the intermediate position 44" of the array in FIG. 4. The next deployment step consists of a 90° rotation of the array with respect to the canister 92, in order to orient the array so that it will unfurl as described in the next step of deployment. This rotation occurs only during the initial deployment sequence and does not occur again during normal operation of the array. The next deployment step consists of the extension of the coilable mast 96 from the canister 92, which causes the array to unfurl in an accordian-like manner in a direction away from the facility module 22. This is followed by a rotation of 180° about the outboard gimbal 84 in order to place the array in the solid line position 44 of FIG. 4, that is, with the solar collecting surfaces of the array facing upwardly and the coilable mast on the underside of the array.

Although at this point the array 44 is in its fully deployed position, a further 90° rotation about the central gimbal 82 is carried out to bring the array to the phantom position 44''' of FIG. 4. This is done to facilitate orbital emplacement of the spacecraft 20 from the Shuttle vehicle. In this connection, it is noted that the spacecraft 20 is berthed to the Shuttle during initial deployment by means of the upper berthing mechanism 28 of the facility module 22, and, as a result, the berthed spacecraft 20 is oriented with the supply module end facing away from the Shuttle. In the phantom position 44''', the array is also facing in this direction. The array is maintained in the phantom position 44''' during and after removal from the Shuttle berthing adapter, to protect the array from the plume created by the Shuttle engines. After the spacecraft 20 is clear of the Shuttle vehicle, a 90° rotation is carried out about the gimbal 82 in the reverse direction in order to restore the array to the solid line position 44, its nominal operational position.

During normal operation of the spacecraft 20, the array 44 is periodically rotated about the outboard gimbal 84 to achieve solar tracking. While it is sometimes useful to combine these rotations with rotations about the central gimbal 82 to improve solar tracking, this is ordinarily not necessary. An additional use of the central gimbal 82, after initial deployment of the solar arrays, is to pivot the arrays to a protected position during Shuttle berthing. The inboard gimbal 80 is used to move the solar arrays out of the way during supply module changeout, and is also used to prevent interference between the arrays of coupled spacecraft during modular expansion as will now be described with reference to FIGS. 5 and 6.

Figure 5:
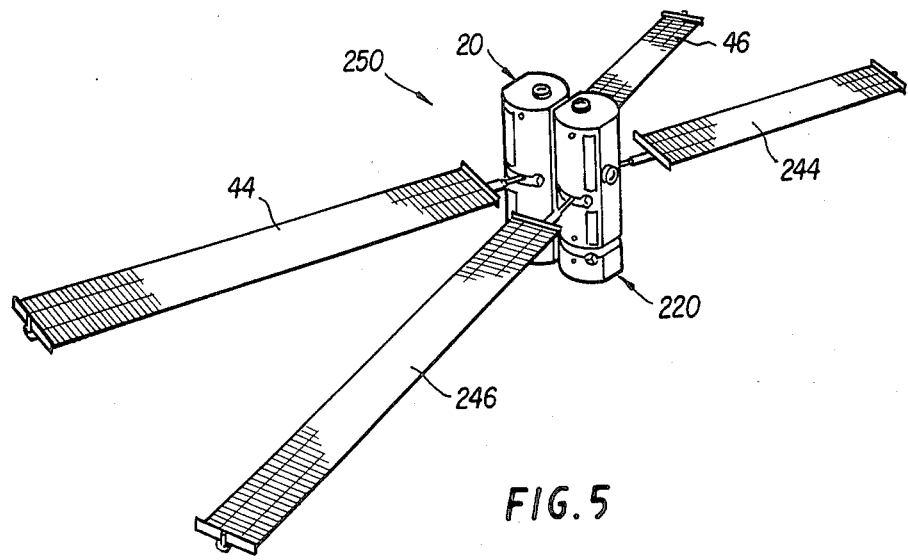
FIG. 5 is a perspective view of a modular spacecraft system comprising two identical spacecraft modules of the type described herein.

FIG. 5 illustrates a modular spacecraft system 250 consisting of two identical spacecraft modules 20, 220 of the type described above. The two spacecraft modules are joined by their berthing mechanisms 36 (shown in FIGS. 1A and 1B), thereby forming a side-to-side connection as shown. In this configuration the eccentric inner hulls 66 of the two spacecraft are closest to each other. Fluid and electrical lines are established between the two spacecraft in the vestibule area between the coupled berthing mechanisms as described earlier. As can be seen in FIG. 5, the adjoining pairs of solar arrays 44, 246 and 46, 244 of the spacecraft modules 20, 220 are rotated in opposite directions about their inboard gimbals 80 in order to produce an angular spread or spacing between the arrays. This avoids mechanical interference between the adjoining arrays and also prevents one array from significantly occluding the other with respect to incident solar radiation.

Figure 6:
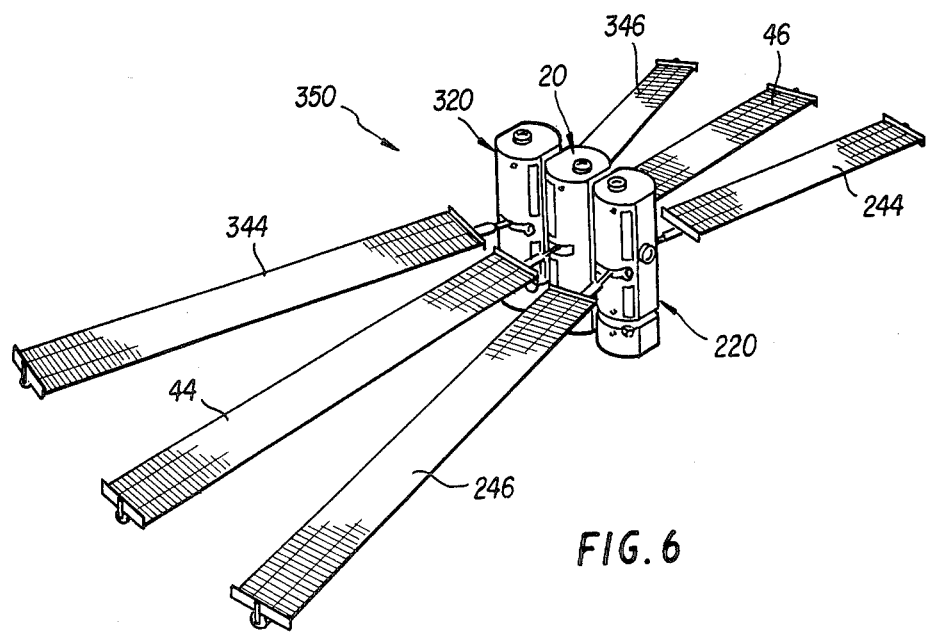
FIG. 6 is a perspective view of a modular spacecraft system comprising three identical spacecraft modules of the type described herein.

FIG. 6 illustrates a modular spacecraft system 350 consisting of three identical spacecraft modules 20, 220 and 320. The first two spacecraft modules 20, 220 are joined in the same way as shown in FIG. 5. The third spacecraft module 320 is joined by its berthing mechanism 36 to the second berthing mechanism 38 of the first spacecraft module 20, and thus has its pressure hull 66 in physical communication with those of the first two spacecraft modules 20, 220. Fluid and electrical connections may be established between the third module 320 and the first module 20 in the vestibule area between their respective berthing mechanisms. In the three-module system of FIG. 6, interference between adjoining solar arrays is avoided by rotating the arrays 244, 346 and 246, 344 in opposite directions about their inboard gimbals 80 as shown. The arrays 44, 46 of the first spacecraft module 20 occupy a central position between those of the second and third modules and hence do not require this rotation to provide clearance.

The two-module and three-module systems of FIGS. 5 and 6, respectively, provide an increased material processing capability as well as increased generation of electrical power from the additional sets of solar arrays. Hence it is possible to carry out materials processing operations on as large or small a scale as desired, merely by combining different numbers of modules. In the illustrated embodiment, it is possible to join up to six or more modules in a side-by-side arrangement and still have sufficient gimbal travel to avoid unacceptable shading and mechanical interference between the arrays of adjacent spacecraft. Since each module is capable of operating independently and carries its own payloads, solar arrays, heat radiators, fluid storage tanks, and so on, multiple-module systems are possible without exceeding the capacities of the individual units. Thus, orderly growth of the modular spacecraft system is possible without the need to alter the basic module design. In addition, logistic support is simplified since the Shuttle vehicle is required to visit only one modular spacecraft system, rather than several individual spacecraft at different locations.

FIGS. 7–11 are detailed sequence views illustrating the series of operations that is carried out to deploy the solar array 44. It is to be understood, of course, that the second array 46 has the same construction and is deployed in exactly the sme way, except that it is mounted on the inner pressure hull 66 in a mirror-image relationship with respect to the first array 44.

Figure 7:
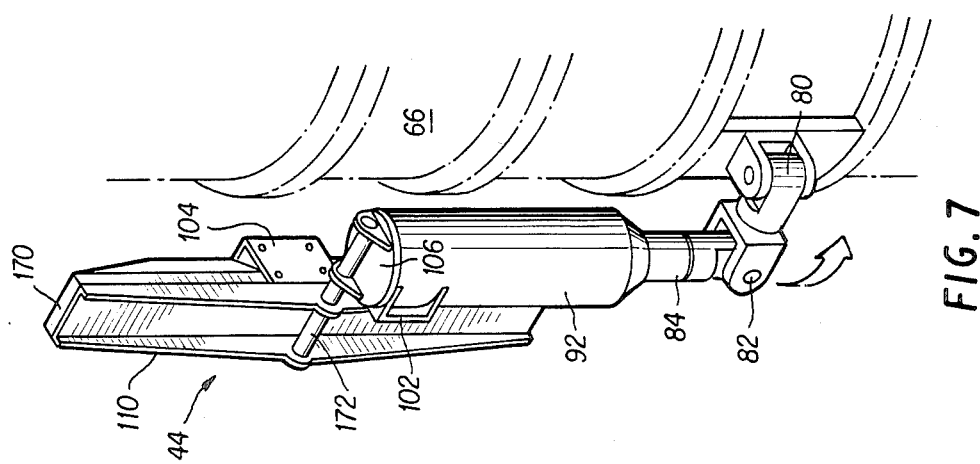
Figure 11:
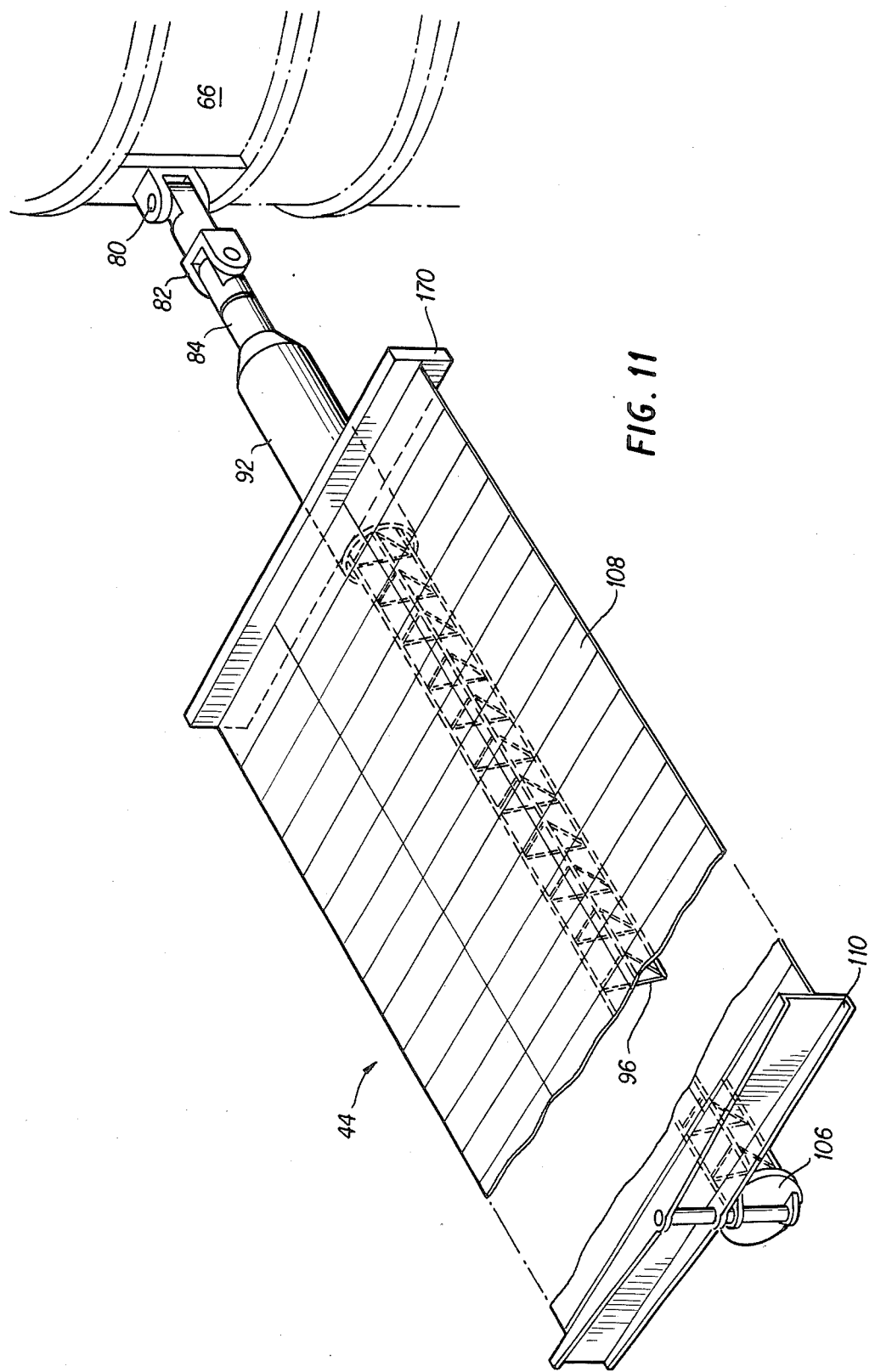

Referring first to FIG. 7, the components of the solar array 44 will be seen to comprise the canister 92 in which the coilable mast is stored, the end cap 106 of the canister, and a pair of elongated support members 110, 170. The canister 92 contains a coilable mast which extends outwardly from the canister during the deployment sequence, and the mast has its outer end connected to the end cap 106. The end cap 106 is affixed by a pivotal connection 172 to the elongated support member 110. The folded solar array panel is held between the two support members 110, 170 and carried by the support member 170. A pair of locking plates 102, 104 are provided on the canister 92 and inner support member 170, respectively, in order to fix the support members 110, 170 in the proper rotational position with respect to the canister 92 during the deployment sequence. The array mechanism 44 as a whole is joined to the inner pressure hull 66 of the spacecraft by the gimbals 80, 82 and 84 as described previously.

The deployment sequence begins with a 90° rotation of the array 44 about the axis of the first gimbal 80, as indicated by the arrow in FIG. 7. This causes the array to pivot outwardly, in a direction away from the inner pressure hull 66, so that the array emerges from the external payload area 68 of FIGS. 3A and 3B through the door 48. The array is now in the position shown in FIG. 8, with the canister 92 and support members 110, 170 still oriented vertically but spaced farther away from the inner pressure hull 66.

Figure 8:
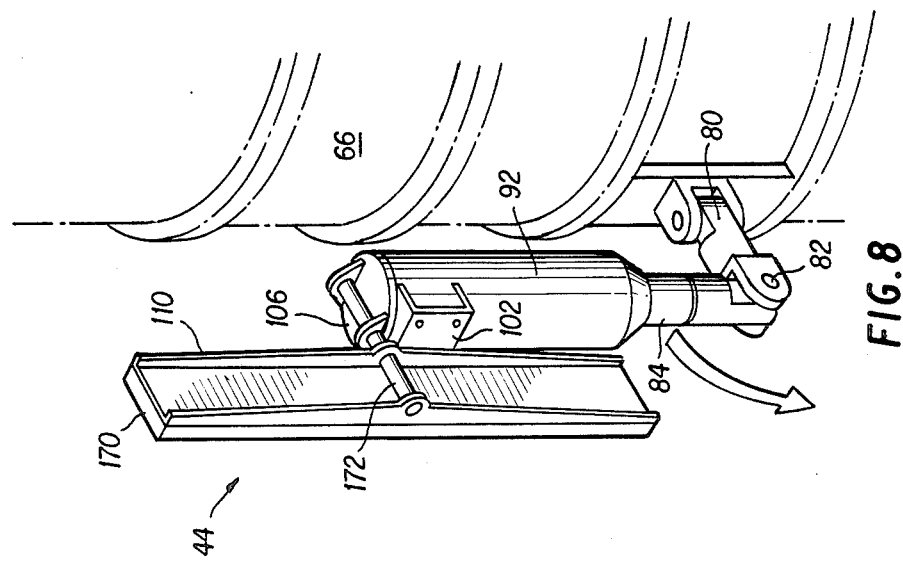

The next step in the deployment sequence is a 90° rotation of the array 44 about the axis of the second gimbal 82, as indicated by the arrow in FIG. 8. This causes the array 44 to assume the position shown in FIG. 9, with the canister 92 and the support members 110, 170 pointing outwardly from the inner pressure hull 66. This is followed by a 90° pivoting motion of the support member 110 with respect to the end cap 106 of the canister 92, as indicated by the arrows in FIG. 9. This movement, which occurs about the pivot rod 172, takes place only during the deployment sequence and normally does not occur after the array has been deployed. After this pivoting movement has been completed, the support members 110, 170 are oriented transverse to the axis of the canister 92 as illustrated in FIG. 10. The plates 102, 104 are now in alignment with each other and thus are permitted to lock together to maintain the transverse relationship of the support members 110, 170 relative to the canister 92.

Still referring to FIG. 10, the next step in the deployment sequence involves the extension of the coilable mast 106 from the canister 92 in the direction indicated by the arrow in the left-hand part of the Figure. As the coilable mast extends from the canister 92, its motion is transmitted by the end cap 106, pivotal connection 172 and elongated support member 110 to the outer end of the folded array panel 108, causing the array panel to unfurl in an accordian-like manner as the elongated members 110, 170 are separated. After the mast 106 and array panel 108 are fully extended, the array 44 is rotated 180° about the axis of the third gimbal 84 as indicated by the right-hand arrow in FIG. 10. This causes the array to assume the fully deployed position of FIG. 11, with the mast 96 supporting the array panel 108 from underneath and the solar collecting surface of the array panel facing upwardly. As mentioned previously, this may be followed by a 90° downward rotation about the axis of the second gimbal 82 in order to pivot the array temporarily to a protected position while the spacecraft 20 is released from the Shuttle vehicle. The array is then restored to the fully deployed position of FIG. 11 after the spacecraft is far enough from the Shuttle so that the plume from the Shuttle engine poses no risk of damage to the array.

Although the present invention has been described with reference to a prefered embodiment, the invention is not limited to the details thereof. Various substitutions and modifications will occur to those of ordinary skill in the art, and all such substitutions and modifications are intended to fall within the spirit and scope of the invention as defined in the appended claims.

What is claimed is:

1. A spacecraft comprising:

a spacecraft body;

at least one solar array extendible outwardly from the spacecraft body; and articulation means for adjusting the position of the solar array relative to the spacecraft body independently about three axes, each of which is orthogonal to the axis adjacent to it, said articulation means comprising first, second and third single-axis rotatable couplings arranged in series, each of said rotatable couplings permitting rotation of the solar array about a different one of said three axes;

said first rotatable coupling connected between the spacecraft body and the second rotatable coupling for permitting rotation of the solar array about a first axis which has a fixed orienation with respect to the spacecraft body;

said second rotatable coupling connected between the first and third rotatable couplings for permitting rotation of the solar array about a second axis normal to the first axis, said second rotatable coupling being connected to each of said first and third rotatable couplings without any intervening degrees of rotational freedom; and said third rotatable coupling connected between the second rotatable coupling and the solar array for permitting rotation of the solar array about a third axis normal to the second axis, said third axis having a fixed orientation relative to the array which is parallel to the longitudinal axis of the array.

2. The spacecraft of claim 1 wherein the spacecraft body comprises a compartment for stowage of the solar array.

3. The spacecraft of claim 1 wherein the spacecraft body comprises an inner chamber having a generally cylindrical shape which is located within the spacecraft body in a position such that the longitudinal axis of the inner chamber is parallel to and displaced from the longitudinal axis of the spacecraft body.

4. The spacecraft of claim 3 wherein the spacecraft body comprises a compartment for stowage of the solar array which is located within the spacecraft body and outside of the inner chamber.

5. The spacecraft of claim 4 wherein the solar array is stowable in and deployable from the compartment by means of the first rotatable coupling.

6. A spacecraft comprising:
a spacecraft body;
at least one solar array extendible outwardly from the spacecraft body;
articulation means for adjusting the position of the solar array relative to the spacecraft body independently about two orthogonal axes, said articulation means comprising first and second single-axis rotatable couplings arranged in series, each of said rotatable couplings permitting rotation of the solar array about a different one of said two axes;
said first rotatable coupling permitting rotation of the solar array about a first axis, and being connected to the spacecraft body with no more than one degree of rotational freedom therebetween; and
said second rotatable coupling connected between the first rotatable coupling and the solar array for permitting rotation of the solar array about a second axis normal to the first axis, said second rotatable coupling being connected to said first rotatable coupling with no intervening degrees of rotational freedom, and said second axis having a fixed orientation relative to the array which is parallel to the longitudinal axis of the array, wherein the first rotatable coupling is located inboard of the second rotatable coupling relative to the spacecraft body.

* * * * *